(12) United States Patent
Okumoto

(10) Patent No.: US 6,234,032 B1
(45) Date of Patent: May 22, 2001

(54) LOAD MEASURING METHOD AND AN APPARATUS THEREFOR

(75) Inventor: Yutaka Okumoto, Tokyo (JP)

(73) Assignee: Japan Tobacco Inc., Tokyo (JP)

( * ) Notice: Subject to any disclaimer, the term of this patent is extended or adjusted under 35 U.S.C. 154(b) by 0 days.

(21) Appl. No.: 09/041,132

(22) Filed: Mar. 12, 1998

(30) Foreign Application Priority Data

Mar. 14, 1997 (JP) .................................................. 9-061087

(51) Int. Cl.$^7$ ........................................................ G01L 1/16
(52) U.S. Cl. .................................................................. 73/862.68
(58) Field of Search ............................... 73/765, 766, 777, 73/862.68, 862.041, 862.042, 862.043, 862.044, 862.045, 862.046

(56) References Cited

U.S. PATENT DOCUMENTS

| | | | |
|---|---|---|---|
| 4,261,195 | * 4/1981 | Lockery | 73/1 B |
| 4,380,175 | * 4/1983 | Griffen | 73/862.67 |
| 4,576,052 | * 3/1986 | Sugiyama | 73/862.63 |
| 4,600,067 | * 7/1986 | Artigue et al. | 177/211 |
| 5,534,773 | * 7/1996 | Tsugai et al. | 324/105 |

* cited by examiner

Primary Examiner—Benjamin R. Fuller
Assistant Examiner—Jewel V. Thompson

(57) ABSTRACT

A load measuring method and a load measuring apparatus employ two piezoelectric elements having the same characteristic. When a load is applied to a first piezoelectric element, a voltage applied to the first piezoelectric element is feedback-controlled so as to cause the output from a first strain gauge affixed to the first piezoelectric element to be reduced to zero, whereby deformation of the first piezoelectric element applied with the load is suppressed to zero. The load applied to the first piezoelectric element is measured from a deformation amount of a second strain gauge affixed to the second piezoelectric element to which is applied the same voltage as the voltage applied to the first piezoelectric element and which is deformed in amount accurately corresponding to that of deformation to be naturally generated in the first piezoelectric element.

5 Claims, 1 Drawing Sheet

FIGURE
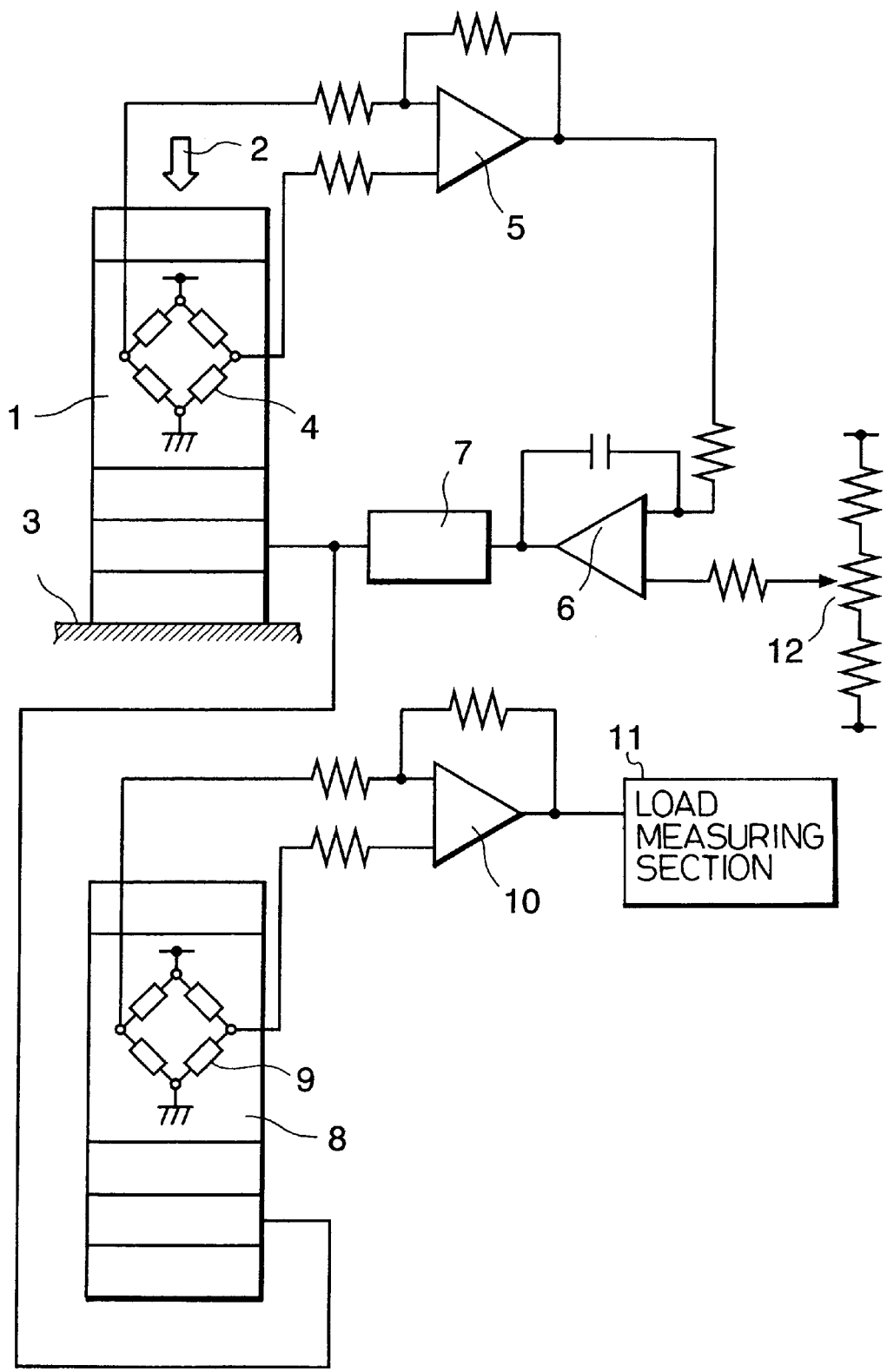

LOAD MEASURING METHOD AND AN APPARATUS THEREFOR

BACKGROUND OF THE INVENTION

1. Technical Field

The present invention relates to a method and apparatus for measuring a load applied to an elastic body on the basis of deformation of the elastic body caused by the applied load, and more particularly, to a method and apparatus for making an accurate load measurement by eliminating the influence of deformation of an elastic body comprised of a piezoelectric element on a measured object or a measured load.

2. Relevant Arts

Most load measuring devices are designed to make a load measurement based on a deformation amount of an elastic body observed when a load is applied thereto. A spring scale, a typical load measuring device, measures a load by utilizing the relation that the elongation of a spring is proportional to a load applied to the spring. A load cell which is another type of load measuring device is comprised of an elastic body, having a small elastic constant, and a strain gauge affixed to the elastic body. The load cell is adapted to measure a load applied to the elastic body by utilizing a change in resistance of the strain gauge caused by deformation of the strain gauge generated by the applied load.

In a load measurement based on deformation of an elastic body, the deformation of the elastic body generally has no substantial influence on a measured object or a measured load (a load to be measured). For example, in the case of measuring the weight of a measured object with use of a spring scale, a spring is elongated when the measured object is suspended from the spring, so that the distance between the measured object and the center of the earth decreases. In a strict sense, therefore, the gravitational force acting on the measured object increases. However, the elongation of the spring is extremely small and hardly affects the accuracy of load measurement.

In some cases, however, the deformation of the elastic body may affect a measured object or a measured load. For instance, in the case of using a load cell to measure a load applied to a wall from a body fixed to the wall when the body is heated, a load generated by the heat expansion of the body and applied to the wall causes the elastic body of the load cell to be deformed. The deformation of the elastic body changes a state of the measured object, resulting in an inaccurate measurement and a meaningless measurement.

SUMMARY OF THE INVENTION

An object of the present invention is to provide a method and apparatus for accurately measuring a load applied to a piezoelectric element, by eliminating the influence of deformation of the piezoelectric element on a measured object or a measured load and by eliminating a measurement error caused by the hysteresis characteristic of the piezoelectric element.

A load measuring method according to one aspect of the present invention comprises the steps of: (a) applying a voltage to a first piezoelectric element, the voltage serving to suppress a deformation which is to be naturally generated in the first piezoelectric element to which a load is applied; (b) applying the same voltage as the voltage applied to the first piezoelectric element to a second piezoelectric element which has the same characteristic as that of the first piezoelectric element; and (c) measuring the load applied to the first piezoelectric element based on an amount of deformation of the second piezoelectric element caused by the applied voltage.

With the load measuring method of the present invention, when a load is applied to the first piezoelectric element so that the first piezoelectric element is going to be deformed, a voltage for suppressing a deformation of the first piezoelectric element is applied to the first piezoelectric element. During the load measurement, the deformation of the first piezoelectric element is reduced to substantially zero by the applied voltage, so that the influence of the deformation on the measured object or the measured load is eliminated. The voltage applied to the first piezoelectric element takes a value corresponding to the load applied to the first piezoelectric element.

However, for the following reason, it is difficult to carry out a meaningful load measurement based on the applied voltage value which reduces the deformation of the first piezoelectric element to zero. In respect of deformation-vs.-applied voltage characteristic, the first piezoelectric element has a hysteresis characteristic which is represented by a hysteresis loop comprised of two curved lines, as in the case of ordinary piezoelectric elements. Upon application of a voltage, therefore, the first piezoelectric element is driven along a corresponding one of these curved lines of the hysteresis loop, which line is determined depending on a history of voltage application to the first piezoelectric element. Thus, the applied voltage required to reduce the deformation of the first piezoelectric element to zero takes one of two different values, depending on the voltage application history. In addition, the difference between these voltage values is large enough to hinder an accurate load measurement. This indicates that a meaningful load measurement cannot be achieved based on the applied voltage which reduces the deformation of the first piezoelectric element to zero. In other words, a difficulty is encountered in accurately measuring the load applied to the first piezoelectric element, while eliminating the influence of the deformation of the piezoelectric element on the measured object or the measured load.

To remove such a difficulty, the load measuring method of this invention comprises the step (b) of applying a voltage to a second piezoelectric element, in addition to the step (a) of reducing the deformation of the first piezoelectric element to zero. The second piezoelectric element has the same characteristic as that of the first piezoelectric element, and has the same voltage application history as that of the first piezoelectric element since it is applied with the same voltage as that applied to the first piezoelectric element. When the voltage is applied to the second piezoelectric element in the step (b), therefore, the second piezoelectric element is deformed in the same amount and in an opposite direction as those of deformation to be naturally generated in the first piezoelectric element which is applied with the load. In the step (c), the load applied to the first piezoelectric element is measured based on the amount of deformation of the second piezoelectric element.

Unlike a case where an attempt is made to measure the load based on the voltage which is applied to the first piezoelectric element to reduce the amount of the piezoelectric element to zero, the method of this invention, which includes the step (b) for converting the applied voltage into a corresponding amount of deformation, is enabled to remove a measurement error caused by the hysteresis characteristic of the piezoelectric element. Therefore, an accurate load measurement can be achieved, which eliminates the influence of deformation of the first piezoelectric element on a measured object or the measured load and a measurement error caused by the hysteresis characteristic of the piezoelectric element.

A load measuring apparatus according to another aspect of the present invention comprises a first piezoelectric element arranged to be applied with a load and a voltage and adapted to be deformed when at least one of the load and the voltage is applied thereto; first strain gauge means affixed to the first piezoelectric element for generating an output indicative of an amount of deformation of the first piezoelectric element; a second piezoelectric element having the same characteristic as that of the first piezoelectric element and adapted to be deformed when a voltage is applied thereto; second strain gauge means affixed to the second piezoelectric element for generating an output indicative of an amount of deformation of the second piezoelectric element; feedback control means for feedback-controlling the voltage applied to the first piezoelectric element so as to cause the output of the first strain gauge means to be reduced to substantially zero; and measurement means for measuring the load applied to the first piezoelectric element based on an output of the second strain gauge means observed when the same voltage as that applied to the first piezoelectric element is applied to the second piezoelectric element.

With the load measuring apparatus of the present invention, when a load is applied to the first piezoelectric element, a minute deformation is produced in the first piezoelectric element. The minute deformation is a small part of deformation to be naturally generated in the first piezoelectric element and which is negligible in points other than the deformation-zeroing control, mentioned below, of this invention. In response to the generation of such a minute deformation, the first strain gauge means immediately generates an output indicative of the minute deformation of the first piezoelectric element. Under the action of the feedback control means, a voltage which reduces the output of the first gauge means to zero is applied to the first piezoelectric element, i.e., the deformation-zeroing control is carried out, thereby eliminating the minute deformation of the first piezoelectric element. During the load measurement, a similar deformation-zeroing control is performed, whereby the deformation of the first piezoelectric element is always reduced to zero.

Then, the same voltage as the voltage applied to the first piezoelectric element is applied to the second piezoelectric element, so that the second piezoelectric element is deformed in the same amount and in the opposite direction as those of the deformation which is to be naturally generated in the first piezoelectric element by the applied load. Based on the output of the second strain gauge means indicative of the amount of deformation of the second piezoelectric element, the load applied to the first piezoelectric element is measured. As a result, an accurate load measurement can be achieved by eliminating the influence of the deformation of the first piezoelectric element on the measured object or the measured load and by eliminating a measurement error caused by the hysteresis characteristic of the piezoelectric element.

In the load measuring apparatus of this invention, preferably, the feedback control means includes setting means for setting a reference output which corresponds to a reference length of the first piezoelectric element, and an integrator for integrating an error between the output of the first strain gauge means and the reference output. The feedback control means feedback-controls the voltage applied to the first piezoelectric element so as to reduce the error to zero.

With this preferred apparatus, the first piezoelectric element is maintained at the reference length during the load measurement, so that the influence of the deformation of the first piezoelectric element on the measured object or the measured load is eliminated. The integration output accurately indicates the voltage to be applied to the first piezoelectric element to maintain this element at the reference length, thereby contributing to an accurate load measurement.

More preferably, the setting means sets the reference output so as to cause the output of the first strain gauge means, observed before applying the load to the first piezoelectric element, to reduce to zero. With this preferred apparatus, the first piezoelectric element is set in advance at the reference length before the load is applied to the first piezoelectric element, and is maintained at the reference length during the load measurement, whereby the load measurement is carried out accurately.

Preferably, the first strain gauge means includes strain gauges which are bridge-connected. With this preferred apparatus, a large output can be taken from the first strain gauge means, and temperature compensation can be made.

BRIEF DESCRIPTION OF THE DRAWING

A single FIGURE is a schematic circuit diagram of a load measuring apparatus according to an embodiment of the present invention.

DETAILED DESCRIPTION

With reference to the accompanied drawing, a load measuring apparatus of an embodiment of this invention will be explained.

The load measuring apparatus is provided with a first piezoelectric element 1 placed on a stationary base 3 and adapted to be applied with a measured load 2, and a second piezoelectric element 8 having substantially the same characteristic as that of the first element 1. First and second strain gauges 4 and 9 which have substantially the same characteristic are affixed to the first and second piezoelectric elements 1 and 8, respectively. Each of the first and second strain gauges 4 and 9 is comprised of a bridge circuit formed by four gauges which are bridge-connected and each of which has a resistance varying in dependence on an amount of its deformation. Each of the first and second strain gauges 4 and 9 has power source terminals between which a DC or AC electric power source is connected and bridge output terminals across which a voltage indicative of an amount of deformation of a corresponding one of the piezoelectric elements 1 and 8 appears. Each strain gauge formed by the bridge circuit may be configured to generate a large output and to have a temperature compensating function. The first and second piezoelectric elements 1 and 8 are disposed in the same condition in respect of thermal environment, etc., to thereby ensure that these piezoelectric elements exhibit substantially the same characteristic and the first and second gauges 4 and 9 affixed thereto exhibit substantially the same characteristic. The second piezoelectric element 8 is disposed so as not to be applied with the load 2. For example, the element 8 is suspended from an appropriate means in the air.

The bridge output terminals of the first strain gauge 4 are connected with input terminals of an amplifier 5 for amplifying the output of the first strain gauge 4. An output terminal of the amplifier 5 is connected with one of input terminals of an integrator 6. Another input terminal of the integrator 6 is connected with a sliding contact of a potentiometer 12 for setting a reference output which corresponds to a reference length of the first piezoelectric element 1. The integrator 6 serves to integrate an error between the output of the amplifier 5 and the reference output supplied from the potentiometer 12. An output terminal of the integrator 6 is connected through a high-gain amplifier 7 with a voltage input terminal of the first piezoelectric element 1.

The amplifier 5 cooperates with the integrator 6, high-gain amplifier 7 and potentiometer 12 to form a feedback control circuit for generating a voltage which suppresses deformation in the first piezoelectric element 1 to be reduced to zero. More specifically, the feedback control circuit generates a voltage which causes the output of the amplifier 5 to be equal to the reference output supplied from the potentiometer 12, and applies the thus generated voltage to the first piezoelectric element 1. In response to the application of this voltage, the first element 1 expands or contracts depending on the polarity of the applied voltage.

The output terminal of the amplifier 7 of the feedback control circuit is also connected to a voltage input terminal of the second piezoelectric element 8. The second strain gauge 9 affixed to the second element 8 has bridge output terminals thereof connected with input terminals of an amplifier 10. An output terminal of the amplifier 10 is connected with an input terminal of a load measuring section 11 which is comprised of an oscillograph, for instance.

Next, the operation of the load measuring apparatus or a load measuring method according to an embodiment of this invention will be explained.

Before applying the load 2 to the apparatus, the setting of the reference output from the potentiometer 12 is made. For example, under a condition where the load 2 is not applied to the first piezoelectric element 1, the moving position of the sliding contact of the potentiometer 12 is adjusted such that the output of the amplifier is reduced to zero, i.e., such that the reference output becomes equal to the output of the amplifier 5 which is indicative of the amount of deformation of the first piezoelectric element 1 detected by the first strain gauge 4. The reference output corresponds to the length of the first piezoelectric element 1 before the load 2 is applied thereto (more generally, the reference length of the first element 1). Once the moving position of the sliding contact has been set, the sliding contact may be fixed at that position.

Upon start of the load measurement, the load 2 is applied to the first piezoelectric element 1. The load 2 naturally causes the first piezoelectric element 1 to be deformed. The load measuring apparatus of this embodiment carries out deformation-zeroing control for forcibly reducing such deformation to substantially zero, as will be explained below.

When the load 2 is applied to the first piezoelectric element 1, a minute deformation is generated in the first element 1. The minute deformation is small enough to be negligible in points other than the deformation-zeroing control, and does not affect the measured object. The first strain gauge 4 is slightly deformed in the same amount as the minute deformation of the first element 1, and the resistance of the gauge 4 varies accordingly. Thus, a gauge output, indicative of the deformation amount of the strain gauge 4, appears across the bridge output terminals of the strain gauge 4. The gauge output is amplified in the amplifier 5 and is then applied to the associated one input terminal of the integrator 6 which integrates an error between the output of the amplifier 5 and the reference output from the potentiometer 12. An integration output of the integrator 6 is amplified in the amplifier 7 and is then applied to the voltage input terminal of the first piezoelectric element 1. In response to the application of this voltage, a minute reverse deformation is generated in the first element 1 which cancels out the minute deformation of the element 1 caused by the applied load 2. As a consequence, the minute deformation of the first element 1 due to the application of the load 2 disappears immediately.

During the load measurement, by means of the deformation-zeroing control, the voltage applied to the first piezoelectric element 1 varies so as to maintain the piezoelectric element 1 at the reference length. Then, the integration output, indicative of accumulated error between the output of the amplifier 5 and the reference output of the potentiometer 12 from when the load 2 is applied, is settled, and hence the voltage applied to the first piezoelectric element is settled. A time period required for the applied voltage to be settled, which is very short in general, varies in dependence on the manner of applying the load, the gains of the amplifiers 5 and 7, the integration constant of the integrator 6, and the like. The thus settled voltage applied to the first piezoelectric element 1 corresponds to the load 2 applied to the first piezoelectric element 1.

On the other hand, piezoelectric elements and strain gauges generally have hysteresis characteristics. That is, the relationship between voltage applied to and length of a piezoelectric element observed in a condition where the piezoelectric element expands as the applied voltage increases is different from that observed in a condition where the piezoelectric element contracts as the applied voltage decreases.

As mentioned above, the voltage applied to the first piezoelectric element 1 finally takes a value corresponding to the load 2. However, due to the hysteresis characteristic of the first piezoelectric element 1, this applied voltage value varies depending on a history of voltage application to the first piezoelectric element 1. Thus, a load measurement error is entailed, if an attempt is made to measure the load 2 based on the voltage applied to the first piezoelectric element 1 to suppress the deformation of the element 1.

In order to eliminate such a measurement error, the voltage applied, with the intention of reducing the deformation of the first piezoelectric element 1 to zero, from the amplifier 7 of the feedback control circuit to the first piezoelectric element 1 is also applied to the voltage input terminal of the second piezoelectric element 8. Deformation, corresponding to the applied voltage, is directly produced in the second piezoelectric element 8 since no load is applied to the element 8. More specifically, the second piezoelectric element 8 is deformed in the same amount and in the opposite direction as those of the deformation which is to be naturally generated in the first piezoelectric element 1 when applied with the load 2.

The deformation of the second piezoelectric element 8 is detected by the second strain gauge 9. The output of the gauge 9 indicative of the deformation amount of the second element 8 is supplied through the amplifier 10 to the load measuring section 11 in which the output of the second strain gauge 9 is subject to polarity inversion. Based on the inverted output of the gauge 9, the deformation amount to be naturally produced in the first piezoelectric element 1 by the applied load, i.e., the load 2 applied to the element 1, is determined.

The amount of deformation to be naturally generated in the first piezoelectric element 1 varies depending on the load applied thereto and the elastic constant of the element 1. Typically, the deformation in the order of 1 $\mu$m takes place when a load of 100N is applied.

As explained above, in the load measuring apparatus of this embodiment, the deformation of the first piezoelectric element 1 is reduced to zero by applying a voltage thereto, thereby eliminating substantial influence of deformation of the element 1 on the measured object and the measured load. Further, under such a condition, the load acting on the first piezoelectric element 1 is measured by the load measuring section 11 on the basis of the output of the second strain gauge 9 indicative of the deformation amount of the second piezoelectric element 8 observed when the same voltage as that applied to the first element 1 is applied to the second element 8. Unlike a case where an attempt is made to perform a load measurement based on the voltage applied to the first piezoelectric element 1, an accurate load measurement can be achieved by the apparatus of this embodiment where a measurement error due to the hysteresis characteristic is eliminated with use of the second piezoelectric element 8 which has the same characteristic and the same voltage application history as those of the first piezoelectric element 1 and which converts the voltage applied to the first and second piezoelectric elements into the deformation of the second piezoelectric element 8, which deformation accurately corresponds to the deformation which is to be naturally produced by the load 2 in the first piezoelectric element 1.

Further, the apparatus of this embodiment reduces a measurement error caused by drift phenomena which cause an amount of deformation of piezoelectric element and output of strain gauge to change with elapse of time, even if the voltage applied to the piezoelectric element is kept unchanged.

The present invention is not limited to the foregoing embodiment, and may be modified variously. For example, the configuration of the feedback control circuit is not limited to that of the foregoing embodiment. Also, the configurations of the piezoelectric elements and stain gauges, the control gains of the amplifiers, the integration constant of the integrator, etc. may be determined in accordance with the magnitude of the measured load, etc.

What is claimed is:

1. A load measuring method comprising the steps of
   (a) applying a voltage to a first piezoelectric element, the voltage serving to suppress a deformation which is to be naturally generated in the first piezoelectric element to which a load is applied and for reducing the deformation of the first piezoelectic element to zero;
   (b) applying the same voltage as the voltage applied to the first piezoelectric element to a second piezoelectric element which has the same characteristic as that of the first piezoelectric element; and
   (c) measuring the load applied to the first piezoelectric element based on an amount of deformation of the second piezoelectric element caused by the applied voltage.

2. A load measuring apparatus comprising:
   a first piezoelectric element arranged to be applied with a load and a voltage and adapted to be deformed when at least one of the load and the voltage is applied thereto;
   first strain gauge means affixed to the first piezoelectric element for generating an output indicative of an amount of deformation of the first piezoelectric element;
   a second piezoelectric element having the same characteristic as that of the first piezoelectric element and adapted to be deformed when a voltage is applied thereto;
   second strain gauge means affixed to the second piezoelectric element for generating an output indicative of an amount of deformation of the second piezoelectric element;
   feedback control means for feedback-controlling the voltage applied to the first piezoelectric element so as to cause the output of the first strain gauge means to be reduced to substantially zero; and
   measurement means for measuring the load applied to the first piezoelectric element based on an output of the second strain gauge means observed when the same voltage as that applied to the first piezoelectric element is applied to the second piezoelectric element.

3. The load measuring apparatus according to claim 2, wherein the feedback control means includes setting means for setting a reference output corresponding to a reference length of the first piezoelectric element, and an integrator for integrating an error between the output of the first strain gauge means and the reference output; and
   the feedback control means feedback-controls the voltage applied to the first piezoelectric element so as to reduce the error to zero.

4. The load measuring apparatus according to claim 3, wherein the setting means sets the reference output so as to cause the output of the first strain gauge means, observed before applying the load to the first piezoelectric element, to reduce to zero.

5. The load measuring apparatus according to claim 2, 3 or 4, wherein each of the first and second strain gauge means includes strain gauges which are bridge-connected.

* * * * *